United States Patent [19]

Savkar et al.

[11] Patent Number: 5,522,489

[45] Date of Patent: Jun. 4, 1996

[54] AUGER CLUTCH MECHANISM FOR AGITATOR/AUGER SYSTEMS

[75] Inventors: Sudhir D. Savkar, Niskayuna, N.Y.; Brian D. Lisek, Louisville, Ky.

[73] Assignee: General Electric Company, Schenectady, N.Y.

[21] Appl. No.: 283,378

[22] Filed: Aug. 1, 1994

[51] Int. Cl.⁶ ................................................. F16D 41/06
[52] U.S. Cl. ........................................ 192/41 R; 192/46
[58] Field of Search ........................ 192/41 R, 46, 192/45

[56] References Cited

U.S. PATENT DOCUMENTS

| 483,533 | 10/1892 | Canedy | 192/41 R |
| 2,979,173 | 4/1961 | Witt | 192/41 R |
| 4,570,769 | 2/1986 | Isaka | 192/46 |
| 4,856,303 | 8/1989 | Hood, Jr. et al. | 192/46 |
| 5,000,721 | 3/1991 | Williams | 192/46 |
| 5,020,648 | 6/1991 | Bush et al. | 192/46 |
| 5,355,979 | 10/1994 | Stephan et al. | 192/41 R |

FOREIGN PATENT DOCUMENTS 736591   5/1943   Germany ..................... 192/41 R

*Primary Examiner*—Adrea L. Pitts
*Attorney, Agent, or Firm*—Patrick K. Patnode; Paul R. Webb, II

[57] ABSTRACT

A novel auger clutch mechanism which may be used with washer agitators and augers. More particularly this mechanism comprises an outer clutch housing and a clutch, wherein the clutch is positioned within the housing. The clutch has a number of outwardly extending ligaments which are flexible enough to be rolled up. When rolled up, the ligaments restrict movement in one direction, yet allow the clutch to move freely in the opposite direction.

9 Claims, 1 Drawing Sheet

AUGER CLUTCH MECHANISM FOR AGITATOR/AUGER SYSTEMS

BACKGROUND OF THE INVENTION

This invention relates to a novel mechanism capable of being used in mechanical apparatuses. More particularly, this mechanism comprises an outer clutch housing having a simplified clutch positioned therein. Said mechanism may be employed with washing machine agitator/auger systems.

Auger clutch mechanisms, in general, are employed in mixing apparatuses. They rotate in one direction while the agitators they are connected to oscillate back and forth. Such a result is often desirable since it yields maximum stirring/mixing. In the past, many different combinations have been utilized to reach this desired result.

Conventional auger clutch mechanisms, generally employ a large number of interrelated parts to create a rotation/oscillation effect. Having a large number of components within a mechanism adds to the complexity of the device and results in a more involved assembly. Furthermore, extra time must be devoted to an involved assembly resulting in a substantial amount of labor and an increase in overall cost of the mechanism.

Accordingly, there is a need for an improved auger clutch mechanism which has an uncomplicated assembly. This improved auger clutch mechanism would ultimately last longer, save time during manufacturing, and inevitably result in an overall cost savings for the consumer.

SUMMARY OF THE INVENTION

The above-mentioned needs are met by the present invention which relates to a novel apparatus which may be used with a washing machine agitator/auger system. More particularly, the apparatus comprises an outer clutch housing having a simplified clutch therein. This novel apparatus provides a simple, durable, and cost effective means for creating rotation and agitation.

The components of the instant invention are novel yet simplistic in design. The clutch housing and the clutch may both be formed using a single draw mold, creating a more efficient process which equates to a lower manufacturing cost. Having few parts, the apparatus is uncomplicated yet highly effective. Assembly during manufacture is simplified because of the apparatus' reduced part count, creating further cost reduction in the manufacturing process.

Other objects and advantages of the present invention will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
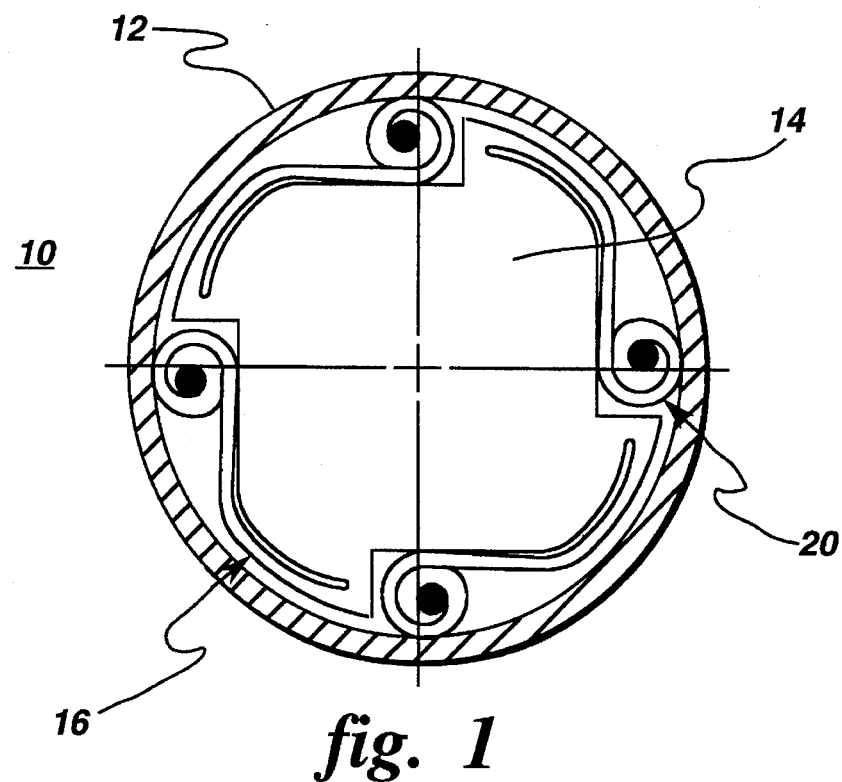
FIG. 1 is a schematic of the instant invention showing an assembled clutch mechanism.
Figure 2:
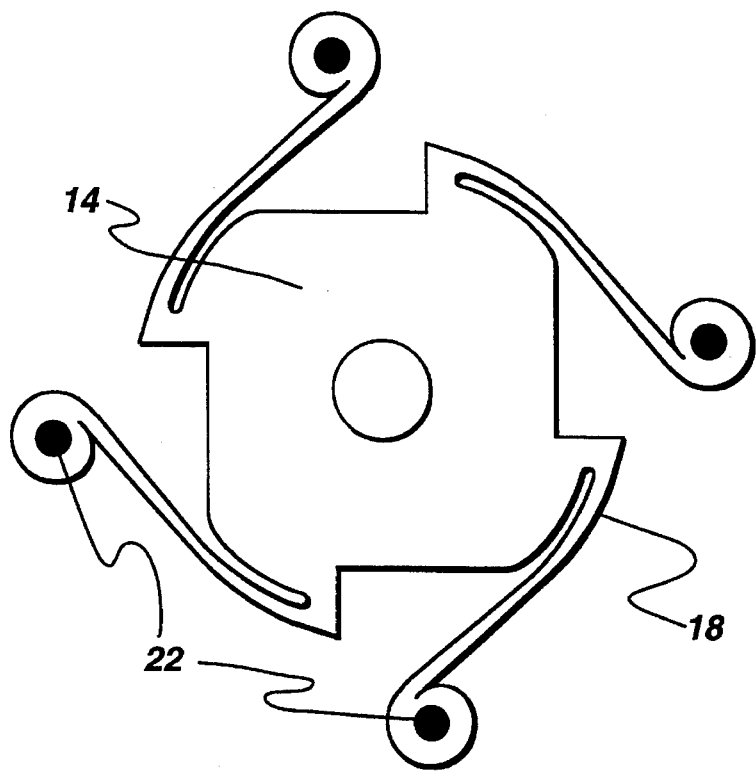
FIG. 2 is a schematic of the instant invention depicting a clutch only.

Referring to FIGS. 1 and 2 of the drawings, an auger clutch mechanism 10 is depicted which may be employed with a washing machine agitator/auger system. Said auger clutch mechanism 10 is comprised of two components, a clutch housing 12 and a clutch 14 positioned therein.

Said clutch housing 12 is generally cylindrical in shape and made generally from a specified material capable of being simply cast in a single draw mold. The preferred specified material is often a plastic such as polypropylene, which allows said clutch housing 12 to be molded into a durable, rigid form which is feasibly priced to manufacture.

Said clutch 14 has a number of outwardly extending ligaments 16, typically four. Each ligament 16 comprises a thin flexible shaft 18 and a roll-end 20 located at the outer extremity of said shaft 18. Located within each roll-end 20 is a knob 22. Each knob 22 may be fabricated during manufacture or more efficiently may simply be the remnants of plastic feed sprues. The feed sprues, as used herein, are defined as the area of injection for a single draw mold.

Said clutch 14 should be made from a specified material capable of being simply cast in a single draw mold. The preferred specified material is often a filled plastic such as talc-filled polypropylene which allows said clutch 14 to be flexible enough to function properly yet feasible to manufacture.

Each roll-end 20 should be partially rolled up into each shaft 18 of said ligaments 16 prior to being inserted within said clutch housing 12.

Said auger clutch mechanism 10 may be rotatably mounted to an auger and an agitator. An auger should preferably move in only one direction allowing the mechanism to turn and churn a work product (for example clothing). An agitator on the other hand does not move in only one direction, but simply oscillates back and forth to create maximum stirring/mixing. During operation in a washing machine, said auger clutch mechanism 10 may be mounted as such:

i) Said clutch 14 being fixedly attached to an agitator, preferably by vibration welding means.

ii) Said clutch housing 12 being fixedly attached to an auger, preferably by a spin weld.

iii) When said clutch 14 and the attached agitator oscillate in a counter-clockwise direction, said ligaments 16 of said clutch 14 are fully extended, and said clutch 14 may move freely within said housing 12 in either direction.

iv) When said clutch 14 and the attached agitator oscillate in a clockwise direction, said roll-end 20 of said ligament 16 will bind against said clutch housing 12 causing said roll-end 20 to roll up further into said shaft 18 of said ligament 16, interlocking said clutch 14 with said clutch housing 12 at a first position.

Said housing 12 as well as the attached auger are then forced to move in a clockwise direction until the agitator ends its movement in the clockwise direction at a second position and swings back in the counter-clockwise direction, allowing said clutch 14 to again move freely within said clutch housing 12. This process continuously repeats itself as the agitator oscillates, allowing the housing 12 and the attached auger to rotate only in one direction even as the agitator they are attached to, oscillates back and forth.

Furthermore, as the specified material of said roll-end 20 of said ligament 16 wears out over time, said roll-end 20 will roll up said shaft 18 further to automatically compensate for wear, allowing this novel first embodiment 10 to have a life cycle which is substantially longer than conventional auger clutch mechanisms.

The foregoing has described an auger clutch mechanism which may be used with a washing machine agitator. While specific embodiments of the present invention have been described, it will be apparent to those skilled in the art that various modifications thereto can be made without departing from the spirit and scope of the invention as defined in the appended claims.

What is claimed is:

1. An auger clutch mechanism comprising:

a clutch housing;

a clutch positioned within said housing, wherein said clutch has a plurality of outwardly extending ligaments comprising a flexible shaft and a roll-end; and wherein said ligaments restrict rotation in one direction as said roll-ends bind against said clutch housing causing said roll-end to roll up into said flexible shaft, while not restricting rotation in the opposite direction.

2. An auger clutch mechanism in accordance with claim 1 further comprising means for causing said clutch to rotate within said housing.

3. An auger clutch mechanism in accordance with claim 1, further comprising an agitator fixedly attached to said clutch.

4. An auger clutch mechanism in accordance with claim 1, further comprising an auger fixedly attached to said clutch housing.

5. An auger clutch mechanism in accordance with claim 1, wherein said clutch is fixedly attached to a washing machine agitator, said clutch housing is fixedly attached to a washing machine auger, and said mechanism is included within a washing machine system.

6. An auger clutch mechanism in accordance with claim 1, wherein said clutch housing is made of a polypropylene polymer.

7. An auger clutch mechanism in accordance with claim 1, wherein said clutch is made of a talc-filled polypropylene polymer.

8. An auger clutch mechanism in accordance with claim 1, wherein said clutch housing is cylindrical.

9. An auger clutch mechanism in accordance with claim wherein said clutch and said clutch housing are made using a single draw mold.

* * * * *